March 31. 1925.
T. A. MORTIMER
1,532,060
DEVICE FOR SHARPENING THE POINTS OF GUARDS OF AGRICULTURAL IMPLEMENTS
Filed Feb. 25, 1922
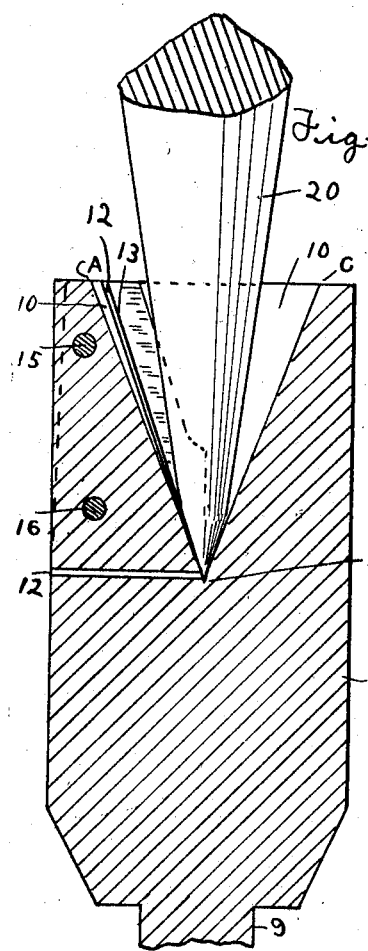
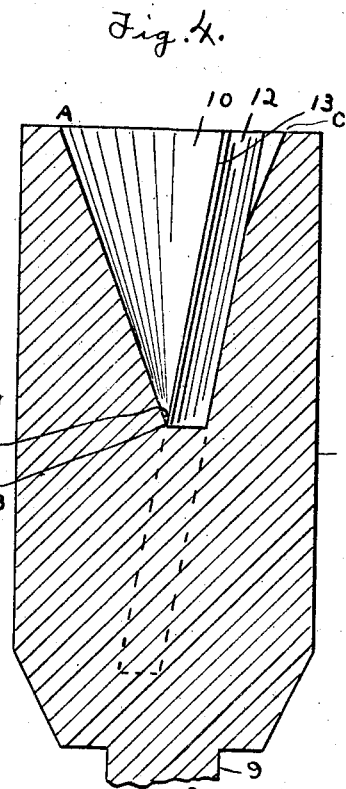
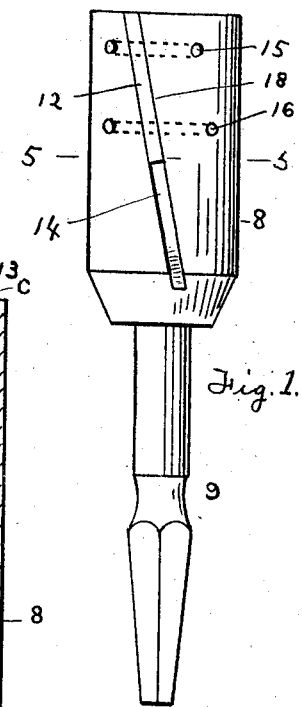
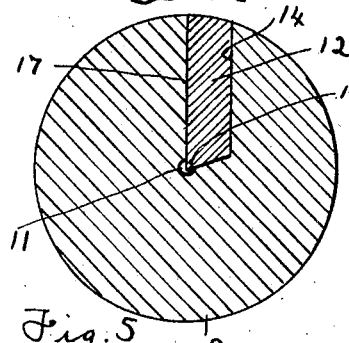
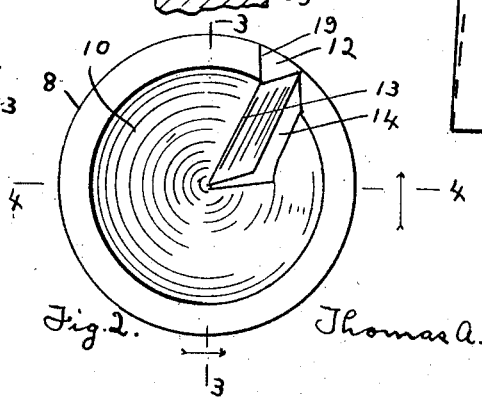
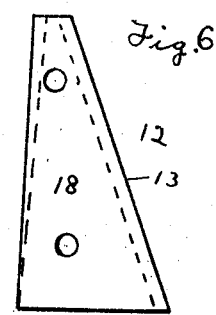
Inventor
Thomas A. Mortimer
By Martin & Rendell
Attorneys Patented Mar. 31, 1925.

1,532,060

UNITED STATES PATENT OFFICE.

THOMAS A. MORTIMER, OF UTICA, NEW YORK.

DEVICE FOR SHARPENING THE POINTS OF GUARDS OF AGRICULTURAL IMPLEMENTS.

Application filed February 25, 1922. Serial No. 539,191.

*To all whom it may concern:*

Be it known that I, THOMAS A. MORTIMER, a citizen of the United States, and a resident of Utica, in the county of Oneida and State of New York, have invented certain new and useful Improvements in a Device for Sharpening the Points of Guards of Agricultural Implements; and I do hereby declare that the following is a full, clear, and exact description thereof, which will enable others skilled in the art to which it appertains to make and use the same, reference being had to the accompanying drawings, and to the reference numerals marked thereon, which form part of this specification.

My present invention relates to a device for sharpening the points of the guards of agricultural implements such as mowing machines, reapers and harvesters.

The purpose of my invention is to provide a device for sharpening the guards of agricultural implements and to provide a device which is simple and durable in construction, readily operated and efficient in action.

A further purpose is to provide a device of the character described of new and improved form and which can be readily used to sharpen the guards without removing them from the machine and which at the same time may be used without injuring adjacent points or parts of the machine and without the operator's hands having to be brought near the point being sharpened or adjacent points of the machine.

A further purpose is to provide a device of the character described that does not require an expert mechanic for its manipulation but will give satisfactory results in the hand of an ordinary operator of agricultural implements.

Another purpose of my invention is to provide a device of the character described having a rotatable head with a conical shaped recess into which projects the cutter so that the cutter is readily held in contact with the guard point; and further to have the recess and cutter at a more obtuse angle than the point of the guard so that the device may be readily used even where the points have become bent or decidedly turned over and further so that the guard may be re-pointed with the cutting of a minimum amount of metal thus saving time and labor and preventing injury to the guard and preventing the formation of ribs or recesses upon the guard.

A still further purpose of this invention is to provide a device of the form above described having the cutter mounted in the head in a slanting position relative to the axis of the conical shaped recess so that the cutter will have a shearing or what might be called a twisting cutting action so that on a line along the guard point the cutter will cut the extreme point before it cuts the portion further back from the point.

Another object is to so form, arrange and combine the cutter with the head and relative to the point to be sharpened that slightly back from the extreme point the cutter will have a scraping action and preferably will have a scraping action increasing in degree or negative pitch as the cutter extends along the guard from its extreme point.

It is recognized that when the points of the guards of agricultural implements become dulled they do not operate to readily divide the grass or grain and guide it to the knives of the cutter bar but that the dulled points push some of the grass or grain down resulting in a distinct waste of produce and also making the machine draw harder and slower. To overcome this waste of material, labor and time is one of the purposes of my invention by providing a sharpening device at such a reasonable price that any one can have it and by providing a device that can be so readily and quickly used as to invite its being used whenever necessary.

On mowing machines especially the guards soon become burred or hooked as the cutter bar is set to travel closer to or practically upon the ground. Plantain leaves or short wet grass then sticks or catches on these hooked ends (instead of sliding off) and causes the grass to become clogged or wedged in front of the cutter bar. Heretofore the farmer has had to stop at frequent intervals to take off with his hands these wedged weeds and bunches of grass in order to prevent great waste of grass. By providing a simple guard sharpening device and one adapted to be taken by the farmer on the machine and used right in the field, I overcome the waste of grass, time and labor due to such clogging.

Fig. 1 is a side view of a device embodying my invention for sharpening the points of the guards of agricultural implements.

Fig. 2 is an end view of the forward or outer end of the device on an enlarged scale.

Fig. 3 is a central longitudinal sectional view through the head of said device on line 3—3 of Fig. 2 in the direction indicated by the arrow and with the point of a guard projecting into the recess of the head in the relative position it would occupy when the tool is being used.

Fig. 4 is a central longitudinal section through the device on a similarly enlarged scale on line 4—4 of Fig. 2 in the direction indicated by the arrow on said section line.

Fig. 5 is a transverse sectional view on a similarly enlarged scale on line 5—5 of Fig. 1.

Fig. 6 is a side view of the cutter as seen from the side having the cutting edge.

Referring to the drawings in a more particular description it will be seen that the device consists of a head 8 preferably cylindrical in form and having projecting rearwardly therefrom a shank 9 or other means whereby the device may be held and given a rotative action as by being placed in an obvious manner in a bit-stock.

In the forward end of the head 8 is formed a conical recess 10 having its large end at the forward end of the head and its apex 11 well into the head. The axis of the recess 10 coincides with the axis of the head 8. The included angle A, B and C of the recess is considerably greater than the angle of the point of the guard 20 as will be seen from an examination of Fig. 3. In Fig. 3 is shown a guard point as viewed from above. The ordinary guard point when seen in side elevation is of slightly greater angle than as seen from above but the included angle of the recess 10 is greater than any angle of the guard point.

Securely fixed in the head 8 there is provided the cutter 12 of which the cutting edge 13 projects slightly into the recess 10 from its apex towards the mouth or large end of the recess. Preferably the cutter 12 is mounted in the head by providing in the head a slot 14 extending entirely through one wall of the recess from its forward end at least to the apex of the recess but in practice for convenience in making the slot by milling machine the slot extends beyond the apex but having its bottom slope gradually to the outer wall of the head. The slot 14 is of such width as to have the cutter 12 closely fit therein. The cuttter may conveniently be held in this slot by two pins 15 and 16 extending through two sets of aligned holes in the cutter and the head on opposite sides of the slot in an obvious manner. The cutter does not need to extend back of the apex of the conical recess.

The cutter is arranged in the head so as to have its forward face carrying its cutting edge in a plane at an angle to a plane through the longitudinal axis of the head. In other words the cutter as is apparent from the drawings does not extend lengthwise parallel with the head, but slants. At the rear edge the forward side or surface of the cutter is on a line radial to the head or substantially so, but as the cutter slants to one side as it extends towards the forward end of the recess the forward side of the cutter ceases to be radial and as the cutter comes to the forward end of the head the forward side is at an angle of considerably less than one hundred eighty degrees relative to a radius at that point. This will be apparent particularly from a comparison of Figs. 2 and 5. In Fig. 5 being a transverse section substantially at the back portion of the cutter the line 17 in Fig. 5 representing the forward face 18 of the cutter is radial of the head. In Fig. 2 line 19 representing the edge formed by the forward end of the cutter and the forward side 18 is at a considerable angle relative to a radius of the head at that point. One result of this slanting arrangement is that the cutter has a twisting cutting action. The slant of the cutter is towards the left as it extends towards the mouth of the recess as seen in Fig. 1 so that when the head is rotated clockwise as seen from its rear the device will cut the material near the extremity of the guard point before the cutter has reached the corresponding part of the guard point relative to a plane through the part near the extremity of the guard point.

This slanting arrangement of the cutter and consequent shearing action enables the work to be done easier, quicker and with greater regularity and also enables the tool to clear itself of chips.

As will be seen from the drawings also the shape and arrangement of the cutter in the recess is such as to cut "at the center" at the point and close thereto but further back from the guard point to cut with a negative rake or "below center" scraping action. Preferably this below center scraping action will be more pronounced as the distance from the extreme point of the guard increases. This scraping action will be apparent from a comparison of Figs. 5 and 2. In Fig. 5, being a transverse section taken as close as practical to the extreme point of the guard, the cutting edge 13 is at center and the forward side 17 of the cutter slanting back from said cutting edge is radial to the guard point. In Fig. 2 on the other hand, which is a view of the forward end of the head, the forward side 18 of the cutter extends back from the cutting edge 13 on the line 19 which obviously gets a decidedly negative rake or below center cutting action.

The result of this arrangement it will be seen is to get a decided cutting action close to the extreme point of the guard, but to get a scraping or below center cutting action back from the extreme point of the guard and to have this scraping or below center cutting action progressively get further below center or more pronounced scraping as the distance from the extreme point of the guard increases. The purpose of this is to get a decided cutting action at the point where the most pronounced cutting action is necessary and to get a less pronounced cutting action and a more pronounced scraping action as the distance from the extreme point increases. It will be understood that when a guard point becomes dulled or its extreme point bent over it is desirable to at once bring the guard to a fresh decided point and to have the guard taper from that part back to the regular angle with as little cutting away of the body of the guard as is practical. Consequently I have produced a tool which sharpens the extreme point and then tapers off the guard from the point back to the regular old angle of the guard at the included angle of the recess and cutter edge which is considerably greater than the regular angle of the guard. By getting the said scraping action back from the extreme point of the guard the guard is cut only sufficiently to make the new point fairly regular and smooth and blend more or less gradually back into the old angle of the old guard. The more decided scraping action of the tool as the distance increases from the extreme point of the guard also helps to enable the operator to keep the tool centered upon the guard point in the proper way.

The cutters are relatively durable but when one becomes dull it may be readily removed by driving out the pins 15 and 16 and then re-sharpened and re-placed or when needed a new cutter can be procured at small cost and easily placed in the head. As no other part of the tool is really subject to wear or breakage, it will be seen that the device is very durable and economical.

Heretofore when the guards have become dulled, it has been the practice for the farmer to re-sharpen them with a file. This operation is a dangerous one as the man is very apt to injure his hands by bringing them into sharp contact with the ends of adjacent guards. In the use of my device it will be seen that this danger is entirely removed as the hands of the operator do not have to be brought past or near the guard points.

What I claim as new and desire to secure by Letters Patent is:

1. In a device for resharpening the tapering metal points of agricultural implements, the combination of a head adapted to be rotated and having formed in its forward end a conical-shaped recess to receive the point of the guard and being more obtuse than the normal angle of the original sides of the point, and a cutter blade mounted in said head with its cutting edge extending slightly and equally into said recess from its apex towards its outer end, whereby the end of the point can be successively resharpened by cutting the point to a more obtuse angle for a relatively short distance from its point end.

2. In a device for re-sharpening the tapering metal guards of agricultural implements, a head adapted to be rotated and having a conical recess extending into the forward end of the head, said recess being adapted to receive the point of the guard but being of a wider angle than the normal original angle of the sides of the guard points, and a cutter mounted in said head and projecting slightly and equally into said recess from its apex towards its forward end, whereby the end of the point can be successively resharpened by cutting the point to a more obtuse angle for a relatively short distance from its point end, the cutter being placed in the head with its forward surface in a plane slanting relative to the axis of the recess so that the cutter has a scraping action back from the end of the point.

3. In a device for re-sharpening the tapering metal points of agricultural implement guards, the combination of a head adapted to be rotated and having formed in its forward end a conical-shaped recess to receive the point of the guard and being more obtuse than the original angle of the sides of the point, and a cutter blade mounted in said head with a straight cutting edge extending slightly into said recess from its apex towards its outer end, the cutter having its forward surface in a slanting plane relative to the axis of the recess and adapted to produce a progressively greater scraping action as the cutter extends from the apex of the recess, whereby the end of the point can be successively re-sharpened by cutting the point to a more obtuse angle for a relatively short distance from its point end.

4. In a device for re-sharpening the tapering metal points of agricultural implement guards, the combination of a head adapted to be rotated and having formed in its forward end a conical-shaped recess to receive the point of the guard and being more obtuse than the original angle of the sides of the point, and a straight-edged cutter blade mounted in said head with its cutting edge extending slightly and equally into said recess from its apex towards its outer end whereby the end of the point can be successively re-sharpened by cutting the point to a more obtuse angle for a relatively short distance from its point, the length of the sides of such obtuse point being increased slightly at successive re-sharpening operations, the cutter at the apex of the recess being at center relative to the point of the guard but having a negative rake as the cutter extends from the point of the guard.

In witness whereof I have affixed my signature this 18th day of February, 1922.

THOMAS A. MORTIMER.